3,293,295
PROCESS FOR PREPARING AMINES FROM
NITRO COMPOUNDS
Edward A. Swakon, Hammond, Ind., and Edmund Field, Chicago, Ill., assignors to Standard Oil Company, Chicago, Ill., a corporation of Indiana
No Drawing. Filed Aug. 28, 1963, Ser. No. 305,228
5 Claims. (Cl. 260—563)

This application is a continuation-in-part of co-pending application Serial No. 81,271, filed January 9, 1961, and now abandoned.

This invention relates to the production of amines and more specifically pertains to a process for the production of amines by reacting a corresponding nitro compound with carbon monoxide and water in an alkaline medium.

Various processes have been described in the literature for the reduction of nitro compounds to amines. However, no successful process for the reduction of nitro compounds with carbon monoxide to amines has been devised. It is reported in the Journal of the Chemical Society, 1154 (1949) that nitrobenzene was reduced with carbon monoxide to azobenzene in a rather substantial yield at 250° C. and 3,000 atmospheres with the concurrent formation of carbon dioxide. It is also reported that little reduction occurred at 200° C. or at a carbon monoxide pressure below 2500 atmospheres. For this reduction nickel and cobalt catalysts are said to have little effect. In U.S. Patent 2,822,398, nitrobenzene is disclosed as being converted by carbon monoxide to nitrocyclohexane and cyclohexanone at 1000–2000 p.s.i. carbon monoxide and 150 to 250° C. in the presence of Raney nickel, Raney cobalt, palladium on carbon, a silver cadmium catalyst and a zinc oxide on silicate.

According to the process of the present invention nitro aromatic compounds are reduced with carbon monoxide and water in an alkaline medium to amines at a temperature in the range of 200–350° C. and at an initial carbon monoxide pressure of above one atmosphere and preferably 50 to 1000 atmospheres. By this process amine corresponding to the nitro aromatic compounds is produced in yields of about 90 mole percent.

The alkaline reaction medium can be provided by the use of such materials as the bases of alkali or alkaline earth metals, tertiary-amines, and tetra-alkyl guanidines. Preferably the alkaline medium is supplied by the use of sodium and potassium hydroxides, sodium and potassium formates, trialkyl amines such at triethyl amine, trimethyl amine, dimethyl amino methanol, N-n-butyl piperidine, tetramethyl guanidine, tetraethyl guanidine and other tetra-alkyl guanidines. The base materials providing the alkaline reaction medium functions as a promoter or catalyst for the reaction.

The process of this invention may be carried out with or without a solvent. When a solvent is employed, it is preferred that the solvent be inert; i.e., the solvent is free from groups which will react with carbon monoxide and/or water. For example, the solvent would be free of ethylenic unsaturation and also be free from carbonyl groups. The ethylenic unsaturation and the carbonyl groups enter into reactions with carbon monoxide and water in an alkaline reaction medium and therefore provide side reactions competing with the desired nitro-reduction reaction. The solvents preferred for the process of this invention are saturated aliphatic hydrocarbons including the saturated cyclo-aliphatic hydrocarbons and the aromatic hydrocarbons. Halogenated derivatives of these preferred solvents may also be employed as solvents where the nitro organic compound to be reduced also contains halogenated substituents. For example, chloro-benzenes may be used as solvents where chloro-nitrobenzenes are to be reduced to chloroanilines.

Water is involved in the reaction occurring in the process of this invention. The amount of water employed can be varied within the range of 0.1 to 10 moles per mole equivalent of nitro group present in the nitro organic compound to be reduced.

The process of this invention may be simply illustrated by the following general reaction equation:

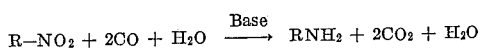

$$R-NO_2 + 2CO + H_2O \xrightarrow{\text{Base}} RNH_2 + 2CO_2 + H_2O$$

wherein R is an alkyl, cycloalkyl, or aryl hydrocarbon group or such hydrocarbon groups substituted with such substituents as methoxy and halogens. It will also be understood that polynitro organic compounds may be used in the process of this invention and their use will result in the formation of polyamides. For example, p-ninitrobenzene by the process of this invention is reduced to p-phenylene diamine. Illustrative of specific organo-nitro compounds are the nitro paraffins containing from 1–20 carbon atoms including but not limited to 2-nitro-propane, nitroheptanes, nitrohexanes, nitrooctanes, nitrododecanes, nitrooctadecanes and the like; such nitro substituted alicyclics as nitrocyclopropanes, nitrocyclopentanes, nitrocyclohexanes, methyl nitrocyclohexane, dinitrocyclohexane (1,2 or 1,3 or 1,4); such nitro aromatics as nitrobenzenes, dinitrobenzenes (o, m and p), trinitrobenzenes, and other higher poly nitrobenzenes, nitronaphthalenes, phenyl nitromethanes, phenyl nitroethanes, nitrobiphenyls, nitrotoluenes, nitroxylenes, nitrotrimethylbenzenes, nitrocumene, nitrocymene, isopropylphenyl nitromethane; among others. Nitro heterocyclic compounds including but not limited to 2-nitrofuran, 3-nitrofuran, 2,5-dinitrofuran, 2-methyl-5-nitrofuran, 2-ethyl-5-nitrofuran, 2,5-dimethyl-4-nitrothiazole, 3-nitrothiophene, 2-nitrothiophene, 2-nitro-3-methyl thiophene, 2,4-dinitro-3-methyl thiophene, 2,5-dinitro-3-methyl thiophene, 2-nitroacridine, 4-nitroacridine, and 2,4-dinitroacridine can be employed as amino reactants in the process of this invention. Also illustrative of the organic nitro compounds suitable as reactants in the process of this invention are the above-specified nitro compounds containing as substituents, in addition to the nitro group, halogens and methoxy substituents such as, for example, nitro-chloroparaffins, nitrochlorobenzenes, nitrochlorobiphenyls, nitrochloronaphthalenes, nitrochlorocyclohexanes, nitromethoxycyclohexanes, nitromethoxybenzenes, nitromethoxybiphenyls, and the like. It will be understood that the nitro reactants may also include such other halogens as bromine, iodine and fluorine.

It is preferred that the nitro aliphatic reactants (both open chain and cyclic aliphatics) be free from ethylenic unsaturation and also do not contain carbonyl groups. The presence of ethylenic unsaturation and the carbonyl group, while not entering the reduction of the nitro group to an amino group, will react with carbon monoxide and water. The compounds containing ethylenic unsaturation will also react with carbon monoxide and water to form aldehydes, alcohols and ketones, in addition to the reduction of the nitro group to amino group. The carbonyl group reacts with carbon monoxide and water, especially in the presence of a primary amino group to form secondary amines together with the reduction of the nitro group. It will be appreciated that these additional reactions will unnecessarily provide a mixture of various reaction products thereby complicating the separation of the desired amino product. However, the broad concept of the process of this invention is not in any way diminished by the presence of these competing side reactions, for the nitro group will still be reduced to an amino group when sufficient water is present to provide the reducing hydrogen.

The process of this invention will be illustrated by the following specific examples.

*Example I*

A rocking stainless steel reactor is charged with one-third mole nitrobenzene, 0.25 mole water, 0.525 mole benzene, 0.0254 mole potassium hydroxide, and sealed. Air is purged from the reactor with carbon monoxide and thereafter the sealed reactor is charged with carbon monoxide to a pressure of 3500 p.s.i.g. The reaction mixture is heated to 297° C. with agitation by rocking the reactor. The reaction mixture is maintained at 297° C. for 5 hours. The pressure in the reactor increases from 3500 to a maximum of 5000 p.s.i.g. and then diminishes during the reaction. Upon cooling the reaction mixture to ambient room temperature (about 25–27° C.) the final pressure in the reactor is about 2200 p.s.i.g. The cooled mixture resulting from the reaction is discharged from the reactor and is a black liquid containing some black solid particles. From this black liquid there is recovered aniline in an amount of about 90 mole percent based on the nitrobenzene charged. The gas bled from the reactor is analyzed and found to contain 61% carbon monoxide, 1.7% nitrogen, 33.3% carbon dioxide, 3.8% hydrogen and 0.1% hydrocarbons.

*Example II*

The process of Example I is repeated except that one-third mole of nitrobenzene is replaced with one-third mole para-nitrochlorobenzene. By this process parachloroaniline may be obtained in a yield comparable to that of the aniline in Example I.

*Example III*

The process of Example I is repeated except that one-third mole nitrobenzene is replaced by one-third mole para-nitromethoxybenzene. By this process paramethoxyaniline may be obtained in a yield comparable to that of the yield of aniline of Example I.

By the process illustrated in Examples I to III benzylamine can be prepared from phenyl nitromethane, phenethylamine can be prepared from 2-phenyl-1-nitroethane, 1-naphthalene methylamine can be prepared from naphthyl nitromethane, para phenylene diamine can be prepared from para dinitrobenzene, 1,4-anthradiamine can be prepared from 1,4-dinitroanthracene, 3-biphenylamine can be prepared from 3-nitrobiphenyl, xenylamine (4-biphenylamine) can be prepared from 4-nitrobiphenyl, 1,2,3-benzene triamine can be prepared from 1,2,3-trinitrobenzene, and 3,4-biphenyl diamine can be prepared from 3,4-dinitrobiphenyl.

*Example IV*

Cyclohexylamine may be prepared by charging to an autoclave the following materials in the proportions indicated: 1 mole nitrocyclohexane, 1 mole water, 0.05 mole sodium hydroxide, sufficient solvent to provide an adequate heat transfer medium, and charging carbon monoxide to impose a pressure at ambient room temperature of from 50 to 200 atmospheres. The reaction medium is heated to a temperature in the range of 200 to 300° C. with agitation and maintained under these conditions until the pressure in the reactor is dropped to a minimum constant pressure indicating that further carbon monoxide is reacted. The time of reaction would, of course, depend on the reaction temperature; i.e., the reaction proceeds more rapidly at higher temperatures. After reaction equilibrium has been obtained, the reactor contents may be cooled conveniently to ambient room temperature or conveniently to some higher temperature when the reaction mixture is charged to distillation equipment or when the desired cyclohexylamine is to be distilled or flashed from the reaction mixture. In this manner cyclohexylamine in high yields without the formation of dicyclohexylamine can be obtained.

Similarly, cyclohexylamines containing halogen substituents on the cyclohexane ring can be prepared from halo nitrocyclohexanes. For example, parachlorocyclohexylamine can be prepared from paranitrochlorocyclohexane. Also, 1,2, or 3-methoxycyclohexylamine may be prepared from 1,2 or 3-nitromethoxycyclohexane.

Cyclohexyldiamines (1,2 or 1,3 or 1,4) are prepared by reacting under the conditions illustrated in Examples I to IV dinitrocyclohexane (1,2 or 1,3 or 1,4) with carbon monoxide and water.

Alkyl primary amines may be conveniently prepared without the concurrent formation of secondary and tertiary amines by reacting a nitroparaffin with carbon monoxide and water in the process of this invention. For example, isopropylamine can be prepared by reacting by the process of this invention 2-nitropropane with carbon monoxide and water in an alkaline reaction medium. The suitable solvent for this reaction is n-heptane. 1,3-propane diamine can be prepared employing the process of this reaction by reacting 1,3-dinitropropane with carbon monoxide and water in an alkaline reaction medium. Similarly, other paraffinic di- and polyamines can be prepared by reducing by the process of this invention the corresponding di- and poly-nitro paraffins.

In the processes hereinbefore illustrated, tertiary amines such as trimethylamine can be employed in place of potassium hydroxide to provide the alkaline reaction medium. Tetra-alkyl guanidines such as tetramethyl guanidine also can be substituted for potassium hydroxide to provide the necessary alkaline medium. Potassium or sodium formates can be used to supply the alkaline medium for the process of this invention as well as some of the carbon monoxide. When these formates are employed, they are used in the range of from 0.5 to 1 mole of the formate per mole of the nitro compound. It is preferred to employ formic acid with the alkali metal formates. In such a reaction less carbon monoxide need be charged to the reactor autoclave for the thermal decomposition of formic acid will supply some or all of the carbon monoxide.

It is apparent from the foregoing that the process of this invention provides a convenient method for producing aliphatic primary amines without also producing secondary and tertiary amines. This greatly simplifies the techniques of recovery of the desired primary amine.

Another feature of the process of this invention is that the nitro group of an aromatic compound can be reduced to an amino group without also reducing the aromatic ring to a partially or completely saturated ring. It is also an advantage of the process of this invention that a wide range of primary amines, both mono and primary amines, can be prepared employing readily available low cost reactants. It is also possible by the process of this invention to prepare amines by the reduction of the nitro group which are only reduced by other known methods through rather complex reduction systems. For example, by the process of this invention m-chloronitrobenzene can be reduced to m-chloroaniline and nitrobenzoic acids can be readily reduced to amino benzoic acids.

What is claimed is:

1. A process for preparing an amine from the corresponding nitro substituted compound selected from the class consisting of nitro-substituted paraffin hydrocarbons having 1 to 20 carbon atoms, nitro-substituted alicyclic hydrocarbons, nitro-substituted aromatic hydrocarbons, nitro-substituted furans, nitro-substituted thiophenes, nitro-substituted acridine, nitro-substituted chlorinated paraffin hydrocarbons, nitro-substituted chlorinated aromatic hydrocarbons, nitro-substituted chlorinated cyclohexane and nitro-substituted methoxy-substituted aromatic hydrocarbons which comprises reducing only the nitro group with carbon monoxide and water in the presence of an alkaline reaction medium at a temperature in the range of 200 to 350° C. and a carbon monoxide pressure of from 50 to 1,000 atmospheres.

2. The process of claim 1 wherein an inert solvent is employed and said inert solvent is selected from the class consisting of paraffinic hydrocarbons, aromatic hydrocarbons, halogenated paraffinic hydrocarbons and halogenated aromatic hydrocarbons.

3. A process for preparing aniline which comprises reacting nitrobenzene with carbon monoxide and water in an alkaline reaction medium at a temperature range of 200–300° C. and a carbon monoxide pressure of 50 to 1000 atmospheres.

4. The process for preparing cyclohexylamine which comprises reacting nitrocyclohexane with carbon monoxide and water in the presence of an alkaline reaction medium at a temperature in the range of 200 to 350° C. and a carbon monoxide pressure of 50 to 1000 atmospheres.

5. A process which comprises reacting a nitro substituted paraffin hydrocarbon having 1 to 20 carbon atoms with carbon monoxide and water in an alkaline reaction medium at a temperature in the range of 200 to 350° C. and a carbon monoxide pressure of 50 to 1000 atmospheres whereat only the nitro group is reduced to a primary amino group.

References Cited by the Examiner

UNITED STATES PATENTS

| | | | |
|---|---|---|---|
| 1,237,828 | 8/1917 | Schmidt et al. | 260—580 |
| 2,129,631 | 9/1938 | Winans | 260—563 |
| 3,041,377 | 6/1962 | Harast | 260—580 |

FOREIGN PATENTS 524,827   5/1921   France.

CHARLES B. PARKER, *Primary Examiner.*

F. D. HIGEL, *Assistant Examiner.*